United States Patent [15] 3,659,726
Anderson [45] May 2, 1972

[54] PALLETIZING APPARATUS

[72] Inventor: John T. Anderson, Churchville, Pa.

[73] Assignee: Crown Cork & Seal Company, Inc., Philadelphia, Pa.

[22] Filed: Apr. 29, 1970

[21] Appl. No.: 32,908

[52] U.S. Cl. .............................. 214/6 P, 214/6 N, 198/24, 198/31 AB
[51] Int. Cl. ......................................................... B65g 57/24
[58] Field of Search ............... 214/6 P, 6 K, 6 H, 6 F, 6 FS, 214/6 M, 6 N, 7; 198/24, 31 AB

[56] References Cited

UNITED STATES PATENTS

| 3,172,547 | 3/1965 | Holstebroe | 214/6 DK |
| 3,085,696 | 4/1963 | Stainforth et al. | 214/6 P |
| 2,947,405 | 8/1960 | Fenton | 214/6 P X |
| 3,429,469 | 2/1969 | Peterson | 214/6 DK X |
| 3,294,257 | 12/1966 | Davies et al. | 214/6 P |
| 3,402,830 | 9/1968 | Copping et al. | 214/6 DK |
| 2,544,735 | 3/1951 | Strickler | 214/6 N X |
| 2,470,795 | 5/1949 | Socke | 214/6 N X |
| 3,219,203 | 11/1965 | Jeremiah | 214/6 H |
| 2,535,828 | 12/1950 | Ardron | 214/6 N X |

Primary Examiner—Gerald M. Forlenza
Assistant Examiner—Robert J. Spar
Attorney—Woodcock, Washburn, Kurtz & Mackiewicz

[57] ABSTRACT

A palletizer for accumulating layers of cans in patterns of staggered rows. Initially, the rows of cans are individually and sequentially accumulated on an infeed conveyor at two alternate positions along the conveyor. The rows of cans are then individually and sequentially moved to a layer pattern makeup plate where a layer of cans in a pattern of staggered rows accumulates. The makeup plate is then returned to the position adjacent the conveyor while the layer of cans is stripped from the makeup plate and dropped to a pallet or another layer of cans on the plate.

16 Claims, 7 Drawing Figures

Patented May 2, 1972

Patented May 2, 1972

Patented May 2, 1972

PALLETIZING APPARATUS

BACKGROUND OF THE INVENTION

This invention relates to machines for forming layers of articles on a pallet.

In certain prior art can palletizing machines, staggered or mutually displaced rows of cans are accumulated simultaneously behind staggered or nonaligned stops. The cans are advanced on a conveyor in side-by-side relationship until complete and parallel rows of cans have been accumulated behind the stops. In one type of machine, the stops are removed from a position of engagement with the cans to permit the accumulated staggered rows of cans to advance toward the palletizing area. In another type machine, a plurality of parallel staggered rows of cans may be moved laterally and simultaneously to a layer accumulating area. The latter type of machine is shown in U.S. Pat. No. 3,166,203 — Jeremiah wherein successively formed pairs of staggered rows are laterally moved to a layer makeup area.

Generally, prior art can palletizing machines as described above have been prone to producing undesirable voids in the layer pattern. These machines have also presented substantial difficulties due to the leaning or stumbling of cans. The leaning of cans may occur as the cans move along the infeed conveyor during the formation of parallel staggered or mutually displaced rows where the double seam of one can will ride up or step up onto the double seam of another can. As a result, an entire row or cans in adjacent rows may lean. Furthermore, in the arrangement disclosed in the previously mentioned Jeremiah patent, the leaning of the cans may occur as the rows of cans are moved laterally to the layer or pattern makeup area. Stumbling of the cans may occur whenever cans are moved relative to their supporting surface.

In some prior art palletizing machines, particularly those designed to palletize packages or cartons, each layer of articles is accumulated in a predetermined pattern. The pattern is achieved by rotating certain articles as they advance along an infeed conveyor and moving the articles to a pattern makeup area where the layer is accumulated. When the articles are oblong or otherwise irregular in shape, the pattern will comprise a plurality of mutually displaced or staggered rows with the articles in certain rows having an orientation differing with respect to the articles in other rows. In effect, the staggered or mutually displaced relationship of the rows requires both a means for rotating the articles and articles having an oblong or otherwise irregular shape. These same machines have generally moved the accumulated layer in directions perpendicular to the infeed conveyor which precludes operator accessibility to all critical areas of the machine from a position at a single side of the machine. Some of these machines, have utilized extremely complex means for retaining the article in the pattern makeup area and stripping the articles from the pattern makeup area.

SUMMARY OF THE INVENTION

It is an object of this invention to provide apparatus for palletizing articles including cans in voidless patterns of mutually displaced or staggered rows.

In accordance with this object, the invention may be embodied in a palletizing apparatus comprising means for sequentially positioning series of aligned articles in mutually displaced or staggered positions and means for separately and laterally moving each of the series from the mutually displaced or staggered positions to a means for accumulating a layer of articles in a pattern of mutually displaced or staggered rows before the next series of aligned articles is positioned. A traveling retaining rail is provided which moves in a direction parallel to the lateral movement of the aligned articles and perpendicular to the movement of the means for accumulating a layer and which engages the first formed row in the accumulating pattern.

In still further accordance with this object, the means for sequentially positioning series of aligned articles may comprise a conveyor with a sensor means for sensing the first article in a series of aligned articles to reach one of two staggered positions. A pusher means may then laterally move the articles from the conveyor while the articles continue to move on the conveyor.

It is another object of this invention to provide a palletizing apparatus which prevents leaning or stumbling of articles such as cans.

In accordance with this object of the invention, the means for positioning the series of aligned articles such as cans comprises a conveyor in combination with a gate means for engaging and unstepping adjacent cans moving along the conveyor. In further accordance with this object, magnetic means are mounted beneath the conveyor so as to stabilize the cans moving along the conveyor.

It is a yet further object of this invention to provide simplified means for retaining articles in and stripping articles from the means for accumulating a layer of articles.

In accordance with this object of the invention, a rotatable combination stripper and retainer means may be provided. In the retaining position, a retainer member of the combination is rotated into a position of engagement with the articles on the pattern makeup plate. In the stripping position, a stripper member of the combination is rotated into a position of engagement with articles on the pattern makeup plate or the pattern makeup plate is moved to strip the articles from the pattern makeup plate. The combination may also be rotated to a neutral position to permit the pattern makeup plate and the articles thereon to pass beneath the combination.

DESCRIPTION OF THE PREFERRED EMBODIMENT

Figure 1A:
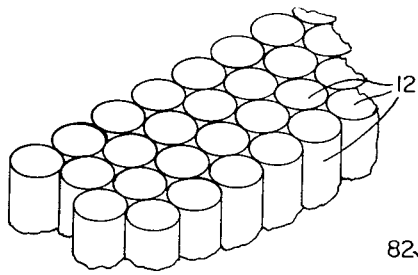
FIG. 1a is a perspective view of several cans in an accumulating layer of FIG. 1.
Figure 1:
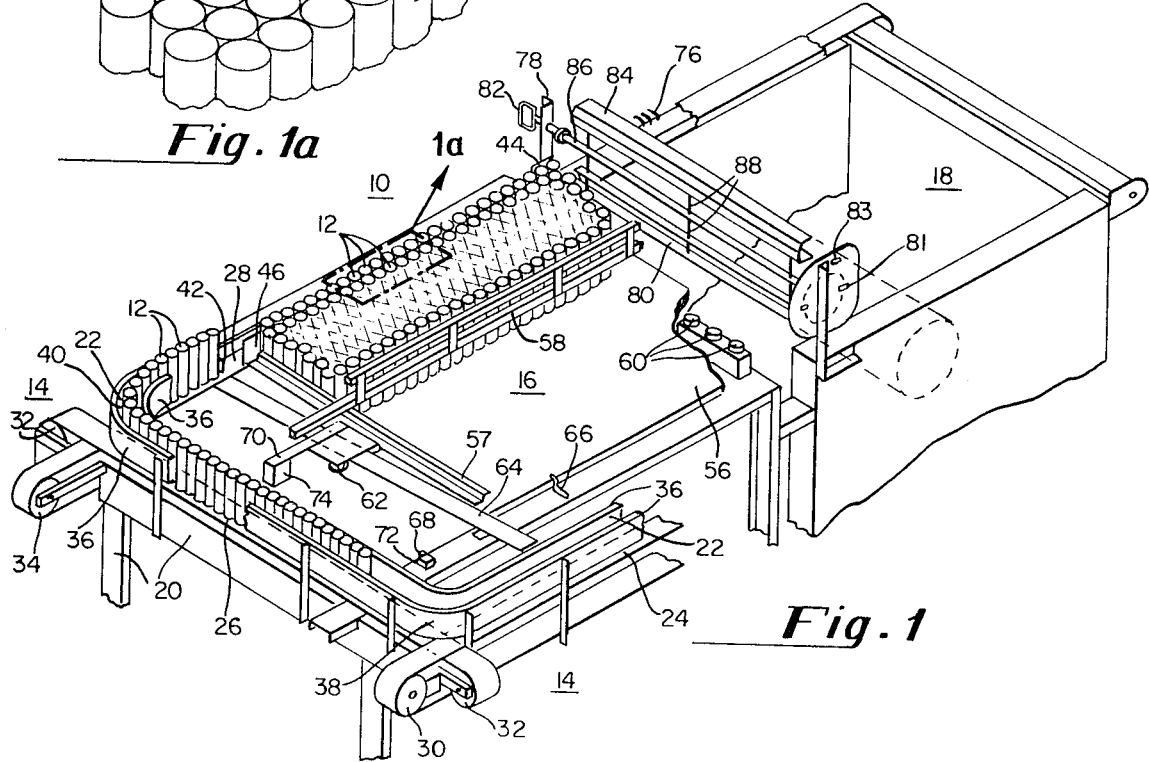
FIG. 1 is a perspective view of the palletizing apparatus during layer accumulation.
Figure 2:
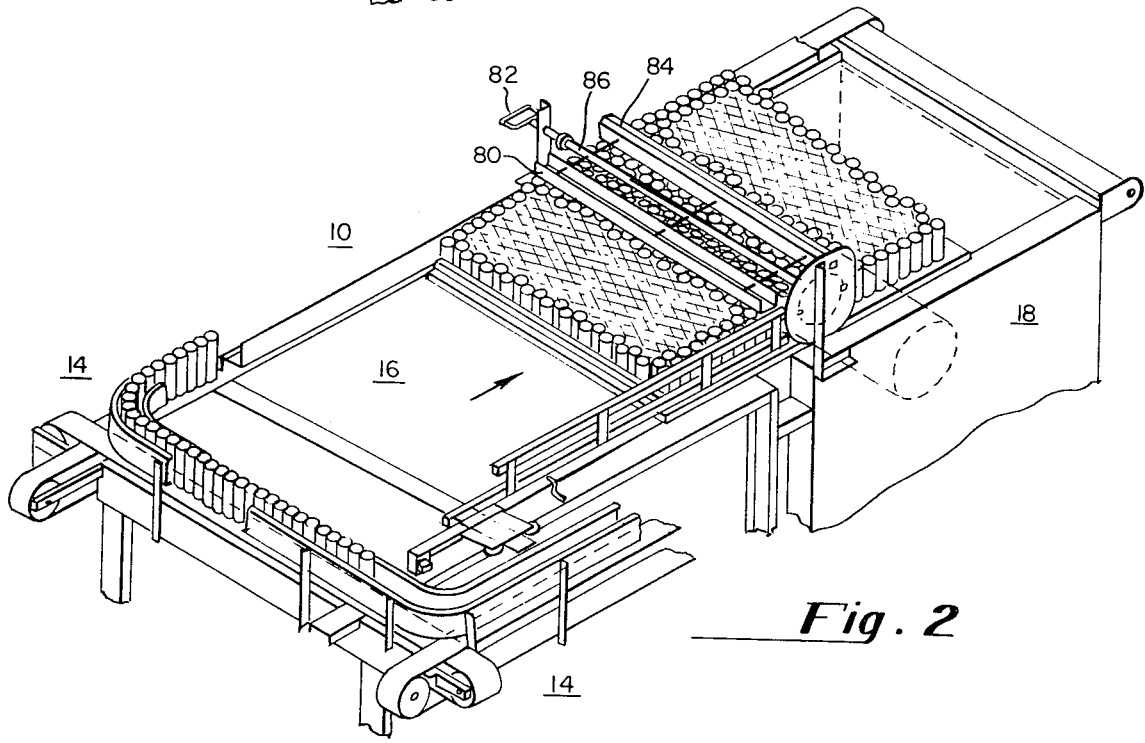
FIG. 2 is a perspective view of the palletizing apparatus of FIG. 1 as the accumulated layer is moved over a pallet.
Figure 3:
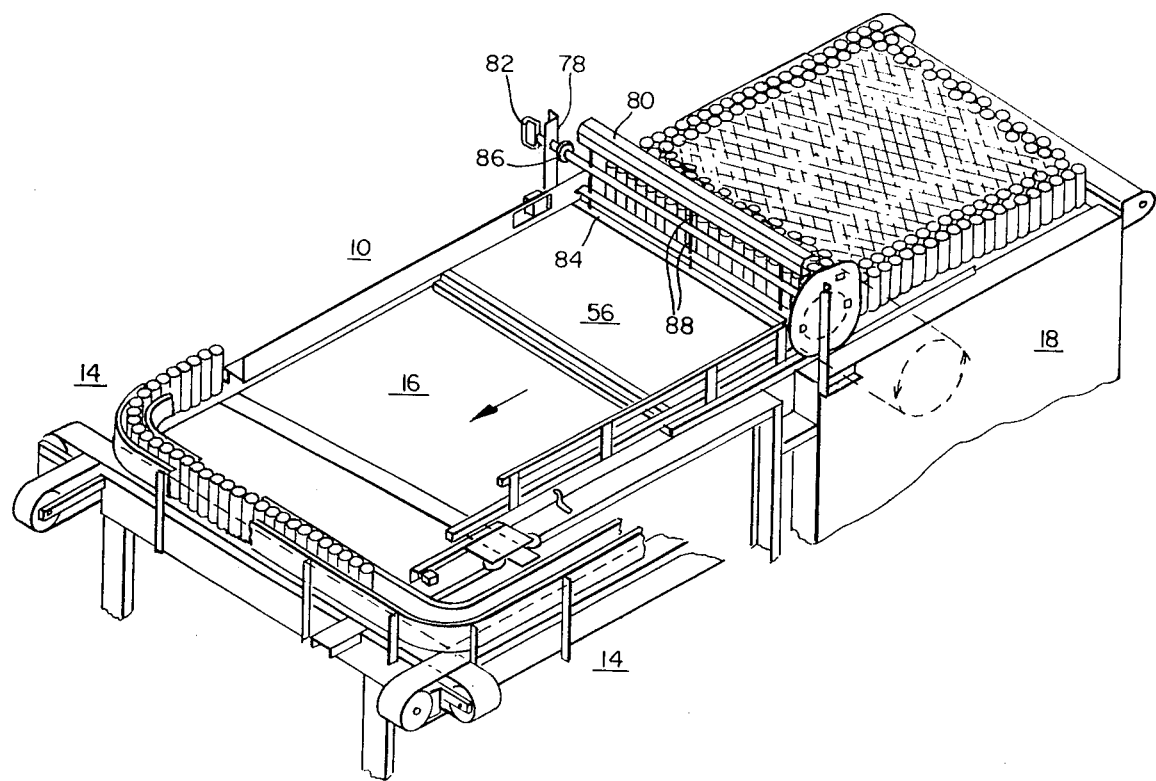
FIG. 3 is a perspective view of the palletizing apparatus of FIG. 1 as the layer is dropped to the pallet.

For an overall view of the invention as embodied in a palletizing apparatus or machine, reference is first made to FIGS. 1–3. As shown there, a machine 10 for palletizing containers or cans 12 comprises three basic sections. A first section, the conveyor section 14, sequentially positions series or individual rows of cans 12 in mutually displaced positions. A second section, the layer accumulation section 16, sequentially accumulates layers of cans 12 in accumulated patterns of mutually displaced or staggered rows. And a third section, the pallet well section 18, accumulates a pallet load of layers on a pallet (not shown). A framework 20 supports the conveyor section 14 and the layer accumulation section 16 to permit the pallet well section 18 to have the substantial depth characteristic of palletizing machines.

Figure 4:
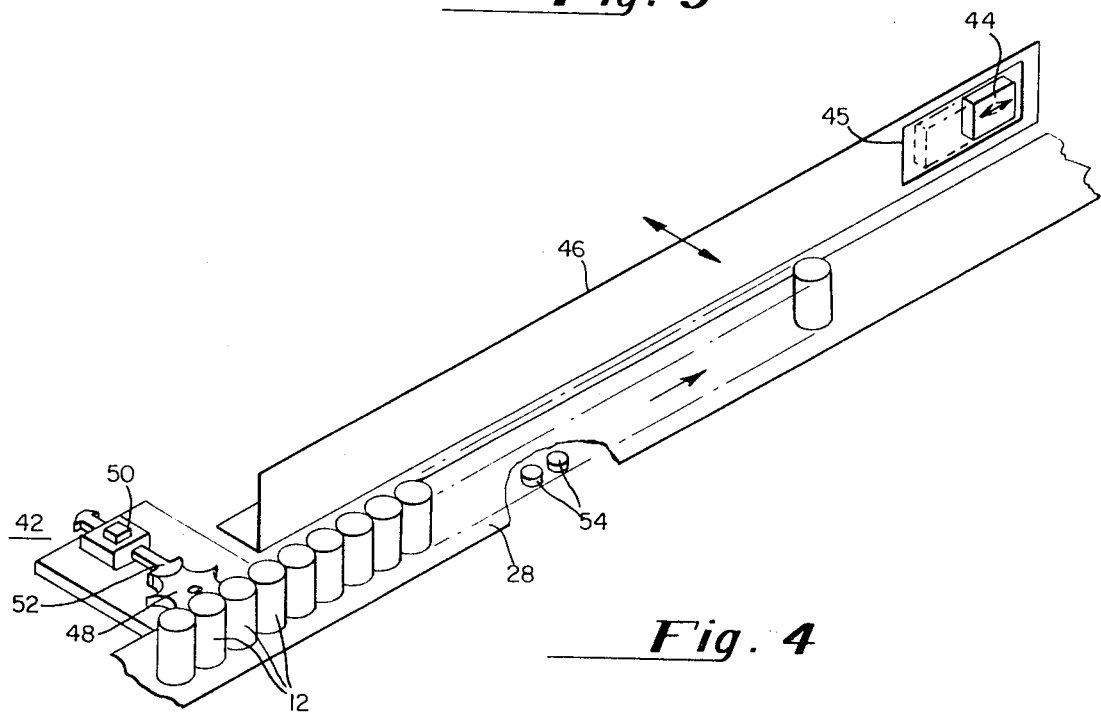
FIG. 4 is a perspective view of the infeed conveyor section of the palletizing apparatus of FIG. 1.
Figure 5:
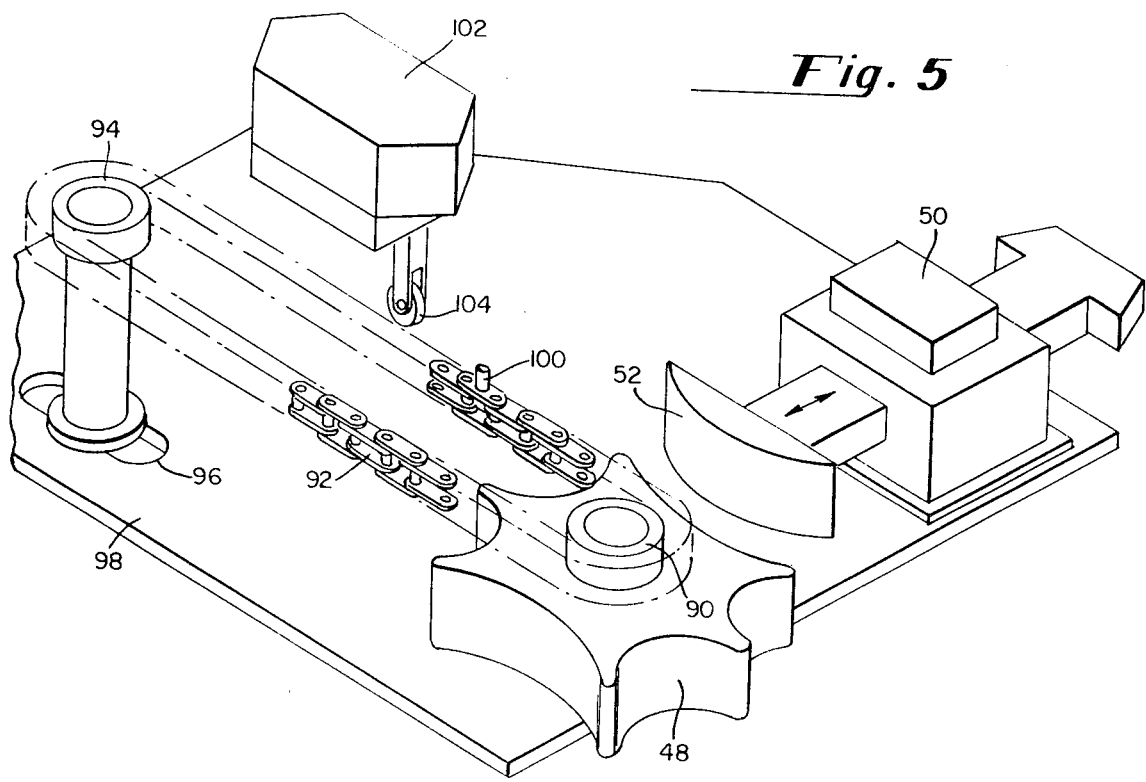
FIG. 5 is a perspective view of the gate means only partially shown in the conveyor section of FIG. 4.

As shown in FIGS. 1, 4, and 5, the conveyor section 14 provides a U-shaped conveyor path 22 for a series of cans. The path is formed by conveyor belts 24, 26, and 28 which are driven by suitable pulley means including a pulley 30, pulleys 32, and a pulley 34 respectively. In order to guide the cans 12 along the U-shaped path 22 which surrounds three sides of the layer accumulation section 16, guide rails 36 are provided on both sides of the conveyors 24, 26, and 28. By mounting the conveyor belts 24, 26, and 28 in overlapping relationship at corners 38 and 40, the cans 12 will move as a series along the U-shaped path 22.

After rounding the corner 40, the cans 12 enter an area of the infeed section 16 which includes means for achieving the very important function of successively positioning aligned series or individual rows of cans 12 in mutually displaced or staggered positions on the conveyor belt 28. A gate means 42 interrupts the advancement of the cans along the U-shaped path 22. In effect, this gate means 42 blocks the cans 12 on the belts 24, 26, and 28 even though the belts continue to move. A movable sensor means 44 which moves between two alternate positions along the conveyor 28 senses the forwardmost can 12 in a series or row of cans which advances along the conveyor belt 28 ahead of the gate means 42. When the sensor means 44 senses the forwardmost can 12, a pusher bar 46 moves laterally across the conveyor belt 28 to move the series or row of cans 12 into the layer makeup section 16. As shown in FIG. 1, a series or row of cans 12 has been moved from the conveyor belt 28 by the pusher bar 46 to form a row of cans in an accumulating layer in the layer accumulation section 16. As shown, other rows have previously been accumulated in the layer pattern makeup section 16 in an identical manner to form the nested pattern shown in FIG. 1.

In accordance with one very important aspect of this invention, the rows in the layer accumulation section 16 are mutually displaced or staggered. The way in which this staggering is achieved may best be understood by reference to FIG. 4. As shown there, a series of cans 12 has advanced on the conveyor belt 28 to a position in contact with the movable sensor 44 mounted in a window 45 of the pusher bar 46. As the cans 12 advance to the sensor 44, other cans 12 on the conveyor 28 as well as the conveyor belts 24 and 26 have their forward advancement interrupted by the gates means 42 which comprises a rotatable star wheel 48 which is locked in position by a locking mechanism 50 including a solenoid or air cylinder actuated locking member 52 which is received by one of the recesses in the star wheel 48. As will be explained subsequently with reference to FIG. 5, the star wheel 48 is locked when a count of cans passing the star wheel reaches a predetermined number.

At the moment the first can 12 in a series or row of cans 12 ahead of the gate means 42 reaches the sensor 44, the pusher bar 46 is actuated in response to the sensing of the forwardmost can 12 to move the aligned series of cans laterally as indicated by the arrows in FIG. 4 as the cans continue to move on the conveyor 28. Since the sensor 44 which may comprise proximity sensing means or other suitable sensing means is mounted to be movable between two alternate positions separated by the distances of the radius of a can 12, (an alternate position is shown in phantom in FIG. 4) successive series of cans 12 will be positioned at alternate positions on the conveyor 28 at the time the pusher bar 46 is actuated. Accordingly, the successive rows accumulated in the layer accumulation section 16 as shown in FIG. 1 are mutually displaced or staggered by a distance equal to the radius of a can 12. Movement of the sensor 44 can be achieved by air cylinders, solenoids, or other suitable means.

In accordance with another important aspect of this invention, means are provided to prevent the leaning and stumbling of cans during infeed. In accordance with this very important aspect of the invention, the star wheel 48 serves to unstep the double seams of cans 12 as they pass through the gate means. This unstepping is the function of the star wheel 48 which in effect separates cans 12 with the points on the star wheel 48 to achieve an aligned series or row of uniformly separated cans 12. Leaning or stumbling of the cans as they move along on the conveyor belts 24, 26 and 28 is prevented by providing magnetic means underlying each of these conveyor belts. The partially broken away conveyor belt 28 in FIG. 4 reveals a row of magnets 54 which extends along the length of the conveyor belt 28 for this purpose. Similar magnets may be provided in conjunction with the other conveyor belts 24 and 26.

Figure 6:
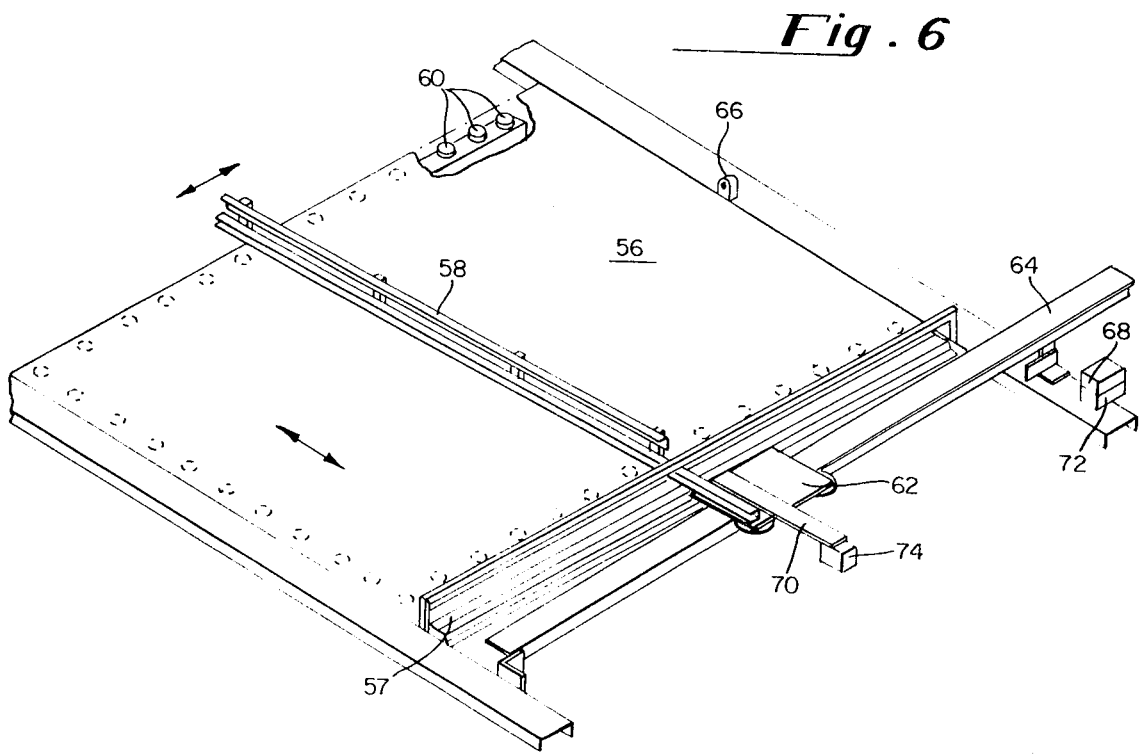
FIG. 6 is a perspective view of the layer accumulation section of the palletizing apparatus of FIG. 1.

As the rows of cans accumulate in the layer accumulation section 16 on a reciprocating pattern makeup plate 56, as shown in FIGS. 1 and 6, a traveling rail 58 engaging the first aligned series or row of cans advances as each row of cans is added to the pattern by the pusher bar 46. In addition, rows of magnets 60 are mounted beneath the pattern makeup plate 56 to provide a further stabilizing influence for the cans 12 and maintain the cans in an upright position.

As the retaining rail 58 travels laterally across the makeup plate 56 with the rows of cans 12 and in a direction perpendicular to the movement of the reciprocating makeup plate 56, and the staggered rows of cans are accumulated, a retaining rail carriage 62 moves up a retaining rail track 64. When a full layer of staggered rows has accumulated on the pattern makeup plate 56, the retaining rail 58 is sensed by a pattern makeup sensing head 66 at the edge of the pattern makeup plate 56. At that same moment, a retaining rail locking magnet 68 mounted at the same edge of the pattern makeup plate 56 will attract an extension 70 of the carriage 62 to hold the retaining rail 58 at the edge of the pattern makeup plate 56 as shown in FIG. 2.

The retaining rail 58 remains locked and the pusher bar 46 remains in the thrust position as shown in FIG. 1 as the pattern makeup plate moves between the layer accumulation section 16 and the pallet well section 18 as shown in FIGS. 2 and 3 in a direction parallel with the material displacement between rows of cans. Once the pattern makeup plate 56 returns to the position shown in FIGS. 1 and 6 the retaining rail is released by a solenoid 72 mounted beneath the retaining rail locking magnet 68. The retaining rail carriage 62 then moves down the inclined track 64 to return the retaining rail 58 by means of gravity to a position adjacent to the conveyor belt 28. A counter-weight 74 is provided at the end of the extension 70 to balance the weight of the retaining rail 58 about the carriage 62. The pattern makeup plate 56 is now ready to accumulate another layer of cans.

As shown in FIGS. 2, 3 and 6, the pattern makeup plate 56 moves in a direction substantially parallel to the direction the cans 12 travel along the conveyor belt 28. This too is a very important aspect of this invention since it allows an operator to reach substantially all critical areas of the palletizing machine 10 from a position along a single side of the machine. More particularly, an operator is able to reach all critical areas of the palletizing machine by standing along side the conveyor belt 28. From this position, the operator may operate controls 76, operate a combination retainer and stripper means 78 and observe the critical movement of the sensor means 44 between the alternate positions to assure the proper formation of a pattern having staggered rows.

As mentioned previously, the framework 20 elevates the conveyor section 14 and the layer accumulation section 16 to permit the pallet well section 18 to have substantial depth. By making the path of travel of the cans along the conveyor belt 28 parallel with the path of travel of the pattern makeup plate 56, the necessary operator platform for supporting the operator need only be provided along one side of the machine adjacent to the conveyor belt 28.

In accordance with another very important aspect of this invention, simplified means are provided for retaining the articles on the pattern makeup plate 56 during pattern makeup and stripping articles from the pattern makeup plate once the pattern has been completely formed. In order to achieve this object, the previously mentioned combination stripper and retainer means 78 is provided. As shown in FIG. 1, the combination 78 is in the retaining position with a retaining bar 80 rotated to the lower position so as to engage the forwardmost cans 12 which are accumulating in the layer accumulation section 16 while the rearmost cans are engaged by a bar 57 mounted on the pattern makeup plate 56. When the full layer of cans 12 has accumulated on the pattern makeup plate 56, the combination 78 is rotated 90° by the operator by means of a handle 82 to a neutral position as shown in FIG. 2. In the neutral position, the retaining bar 80 as well as a stripper bar 84 are elevated and a pressure switch 81 is actuated to move the cans on the pattern makeup plate 56 beneath the combination 78 as the pattern makeup plate moves from a position adjacent the conveyor 28 to a position over the pallet well. When the pattern makeup plate 56 is over the pallet well, the stripper bar 84 is rotated 90° to its lower position by the operator by the use of the handle 82 and a pressure switch 83 is actuated to move the pattern makeup plate 56 out from under the layer of cans 12 to a position adjacent the conveyor 28 as shown in FIG. 6.

The combination 78 includes a rod 86 extending from the handle 82 along the axis of rotation. Tie rods 88 connect the retainer bar 80 and the stripper bar 84 to the rod 86 in diametrically opposing positions with respect to the rod 86. Thus, a simplified means is provided for retaining the cans on and stripping the cans from the pattern makeup plate 56.

Returning now to the gate means 42 and referring to FIG. 5, it should now be appreciated that each of the rows of cans in a layer must have a predetermined number of cans and that the gate means 42 must be actuated so as to assure the proper number of cans. In this connection, the star wheel 48 includes a sprocket 90 for driving a timing chain 92. The timing chain 92 is carried by the sprocket 94 in an elongated slot 96 in a support plate 98 to permit adjustment of the distance between the sprockets 90 and 94. The timing chain 92 includes a pin 100 which is located on one of the links which is advanced as the cans 12 pass through the recesses in the star wheel 48. By interposing a pressure switch 102 having a pressure switch contact wheel 104 in the path of the timing pin 100 and connecting the switch 102 to the solenoid of the locking mechanism 50, the star wheel 48 may be locked into one position by the locking member 52 which is received by a recess in the star wheel 48 to interrupt the flow of advancing cans past the gate means 42.

The length of chain 92 and the indicated adjustable position of the idler sprocket 94 controls the number of cans in each of the rows since the chain is advanced each time a can 12 passes through a recess in the star wheel 48. By utilizing a short chain 92, the timing pin 100 will reach the pressure switch contact wheel 104 after a small number of cans has passed star wheel 48. Similarly, by utilizing a long chain 92 and appropriately moving the idler pulley 94, a large number of cans will pass the star wheel 48 before the timing pin 100 reaches the pressure switch contact wheel 104.

The pallet well section although not described in detail should be understood to be conventional in many respects. It includes a pallet elevator (not shown) which lowers the pallet as each layer is accumulated.

The various drive mechanisms for operating the various components are also substantially conventional.

The preferred embodiment of the invention has been described in terms of a can palletizer. However, it should be understood that the invention might also be embodied in a palletizer for palletizing articles such as packages or cartons or other types of containers. Of course, various modifications obvious to one of ordinary skill in the art might be made in order to accommodate the various sizes and shapes of such articles.

It will be understood that these and other modifications may be made without departing from the present invention as defined by the claims.

What is claimed is:

1. A palletizing apparatus comprising:
   means for sequentially positioning series of aligned articles in mutually displaced positions;
   reciprocating means for sequentially accumulating a layer of articles in a pattern of mutually displaced rows corresponding to said series of aligned articles in mutually displaced positions;
   means for separately and laterally moving each of said series from said mutually displaced positions to said reciprocating means for accumulating a layer of articles before positioning the next of said series;
   a traveling retaining means engaging the first series of aligned articles accumulated on said reciprocating means for maintaining the articles in the upright position as said articles are moved laterally across said reciprocating means, said traveling retaining means moving in a direction perpendicular to the movement of said reciprocating means and parallel to the lateral movement of each said series of aligned articles across said reciprocating means; and
   means for sequentially accumulating a pallet load of layers of said articles on a pallet, said reciprocating means moving in a direction parallel to the mutual displacement of said series of aligned articles at said means for sequentially positioning series of aligned articles.

2. The palletizing apparatus of claim 1 wherein said means for sequentially positioning series of aligned articles comprises a conveyor.

3. The palletizing apparatus of claim 2 wherein said means for sequentially positioning series of aligned articles further comprises a counter and gate means responsive to the count of said counter for blocking said conveyor when the count corresponds to a predetermined number of articles for one of said series.

4. The palletizing apparatus of claim 2 wherein said means for sequentially accumulating layers of articles comprises a rotatable retainer and stripper means, said retainer and stripper means being rotatable to a retaining position so as to engage certain articles along the exterior of each pattern while the pattern is accumulating on said reciprocating means and said reciprocating means is in the position adjacent said conveyor, said retainer and stripper means being rotatable to a neutral position above said reciprocating means so as to prevent interference with said articles as said reciprocating means moves from the position adjacent said conveyor to the position over said pallet, and said retainer and stripper means being rotatable to a stripping position so as to engage certain articles along the exterior of each pattern as said reciprocating means moves to the position adjacent said conveyor.

5. The palletizing apparatus of claim 4 wherein said rotatable retainer and stripper means comprises a retainer bar and a stripper bar in diametrically opposing positions with respect to the axis of rotation, said retainer bar engaging said certain articles in the retaining position and said stripper bar engaging said certain articles in the stripping position.

6. The palletizing apparatus of claim 2 wherein said means for sequentially positioning series of aligned articles comprises a movable sensor located in the path of the articles on said conveyor, said sensor movable between at least two positions along the path of the articles on said conveyor and responsive to the first article in each series for actuating said means for separately and laterally moving each of said series.

7. A container palletizing apparatus comprising:
   conveyor means for advancing containers single file;
   gate means including a movable gate element for counting and interrupting the advancement of said containers on said conveyor means, said gate element engaging each of said advancing containers;
   sensor means movable between at least two alternate positions along the conveyor for sensing the forwardmost can of a row of containers ahead of said gate means;
   pattern makeup means for accumulating a layer of containers in rows staggered according to the position of said sensor;
   pusher means for separately moving each of said successively positioned rows of containers laterally to said pattern makeup means in response to said sensor means while said containers continue to move on said conveyor means and before the next and subsequently positioned row passes said gate element; and
   pallet well means for accumulating layers of containers in compact patterns of staggered rows on a pallet.

8. The palletizing apparatus of claim 7 wherein said gate element comprises a rotatable star wheel having recesses receiving containers moving along said conveyor and said gate means further comprises a timing chain carrying a timing pin driven by said rotatable star wheel and a pressure sensitive switch means engaged by said timing pin after a predetermined time corresponding to a predetermined count of containers passing said rotatable star wheel.

9. The palletizing apparatus of claim 8 wherein said gate means includes lock means responsive to a signal from said pressure sensitive switch to interrupt further rotation of said star wheel thereby preventing containers from passing said star wheel on said conveyor.

10. The apparatus of claim 9 wherein said pattern makeup means comprises a traveling retaining rail which engages the first accumulated row in the compact pattern and moves transversely away from said conveyor as said compact pattern of staggered rows accumulates so as to prevent container stumble.

11. The apparatus of claim 10 further comprising gravity return means for moving said retaining rail transversely toward said conveyor.

12. The palletizing apparatus of claim 11 wherein said pattern makeup means further comprises a pattern makeup plate reciprocating between a position adjacent and essentially parallel to said conveyor and a position over said pallet, and said pallet well means comprises means for stripping said containers from said pattern makeup plate as said pattern makeup plate moves from a position over said pallet to a position adjacent and parallel to said conveyor while said compact pattern of containers falls to the pallet or a previously accumulated layer of containers thereby unstepping the cans.

13. The palletizing apparatus of claim 12 wherein said pattern makeup means comprises retainer means extending along one edge of the accumulating pattern, said retainer means coupled to said stripper means to form a combination stripper and retainer means, said stripper means and retainer means being rotatable between a stripping position for stripping containers from said pattern makeup plate, a retaining position for accumulating containers on said pattern makeup plate and a neutral position permitting said pattern makeup plate to carry containers between the position parallel to and adjacent the conveyor and the position over said pallet.

14. The palletizing apparatus of claim 13 wherein said conveyor includes magnetic means to prevent container stumble, and said pattern makeup plate includes magnetic means to prevent container stumble.

15. In a palletizing apparatus having a layer makeup area for accumulating articles for a single layer on a pallet and a pallet makeup area for accumulating layers of articles on the pallet comprising an article supporting means movable between the layer makeup area and the pallet makeup area, the improvement comprising:

a combination retainer and stripper means rotatable between a retaining position of engagement with an accumulating layer on the article supporting means when the article supporting means is in the layer makeup area, a neutral position of nonengagement with the accumulated layer and a stripping position of engagement with the accumulated layer when the article supporting means moves between the pallet makeup area and the pattern makeup area for stripping the articles from the article supporting means and dropping the articles to a pallet or a layer of articles supported on the pallet, said retaining position being substantially different from said stripping position.

16. A can palletizing apparatus comprising:
conveyor means for advancing cans single file:
gate means for interrupting the advancement of said cans on said conveyor means behind said gate means;
sensor means movable between at least two alternate positions along the conveyor for sensing the forwardmost can of a row of cans ahead of said gate means;
pattern makeup means for accumulating a layer of cans in rows staggered according to the position of said sensor;
pusher means for separately moving each of said successively positioned rows of cans laterally to said pattern makeup means in response to said sensor means while said cans continue to move on said conveyor means and before the next and subsequently positioned row passes said gate means; and
pallet well means for accumulating layers of cans in compact patterns of staggered rows on a pallet.

* * * * *